Dec. 23, 1958  A. J. PETZINGER  2,866,158
ELECTRICAL MEASURING APPARATUS
Filed April 30, 1953

WITNESSES:
E. A. McCloskey
David M. Schiller

INVENTOR
Ambrose J. Petzinger.
BY C. L. Freedman
ATTORNEY

United States Patent Office 2,866,158
Patented Dec. 23, 1958

2,866,158

ELECTRICAL MEASURING APPARATUS

Ambrose J. Petzinger, Fair Lawn, N. J., assignor to Westinghouse Electric Corporation, East Pittsburgh, Pa., a corporation of Pennsylvania Application April 30, 1953, Serial No. 352,242

6 Claims. (Cl. 324—137)

This invention relates to electrical measuring apparatus responsive to quantities of an electrical circuit. More particularly, the invention is concerned with electrical instruments of the induction type, such as integrating watthour meters, which are connected for energization from an electrical circuit through instrument transformers such as current transformers of the through type.

In operation, transformers tend to exhibit ratio errors which cause the actual ratio of primary current to secondary current to deviate to a slight degree from the marked ratio of secondary turns to primary turns. Consequently, the response of instruments energized through transformers may be materially affected by such errors. Ratio errors are caused by the fact that under normal operating conditions of a transformer a certain portion of the primary ampere-turns is utilized to supply magnetizing and core loss currents required by the transformer. Inasmuch as ratio errors are to a large extent dependent upon the portion of the total primary ampere-turns employed to supply magnetizing and core loss currents, ratio errors of through-type transformers having a single-turn primary winding may become relatively large when compared to ratio errors of transformers having multi-turn primary windings under similar conditions of operation of each type of transformer.

For many installations the employment of through-type transformers for supplying energy to instruments required to produce a highly accurate response may be very desirable because of the mechanical sturdiness and compactness characteristic of such transformers. This is especially true in the case of a meter such as that shown and described in Patent No. 2,571,938 to A. J. Petzinger. When through-type transformers are utilized for such purposes, the relatively large ratio errors characteristic thereof may operate to impair the accuracy of response of the instrument to a considerable extent. The problem is especially troublesome for installations having through-type current transformers connected to supply relatively small values of energy to an instrument of the type described in the aforesaid Petzinger patent because ratio errors are characterized by the fact that they vary in accordance with an inverse function of loading of the transformer.

Measuring instruments of the induction type, such as integrating watthour meters, ordinarily are provided with adjustable means for calibrating the instrument at a predetermined light load, such as 10% rated load, to correct the response thereof at light loads of the associated circuit for a predetermined power factor thereof which may be assumed to be unity power factor. Such adjustable means commonly comprises a short-circuited turn of non-magnetic electroconductive material such as brass positioned to intercept a portion of the magnetic flux produced by the associated voltage responsive electromagnetic means. By means of a shaded-pole effect, a torque is produced which is applied to the associated rotatably mounted disk armature. Since voltage of the electrical circuit is maintained substantially constant under normal operating conditions of the circuit, the magnitude of torque established by the adjustable means in a certain position of adjustment thereof will remain substantially constant for all load and power factor conditions of the circuit.

It is desirable that certain instruments of the induction disk-type have a response dependent upon power factor of the associated circuit. That is, the rotational speed of the disk armature should vary substantially in accordance with power factor of the circuit. For example, in the case of an integrating watthour meter, the disk will have a certain speed at unity power factor. Assuming the power factor to be changed to 50% power factor, the speed of the disk should be reduced accordingly to approximately one-half the speed at unity power factor in order that the response of the instrument be representative of energy flowing in the circuit. It is to be noted, however, that because the ratio errors of the energizing transformer become increasingly large as loading of the circuit is decreased, the magnitude of calibrating torque required for ten percent rated load may be sufficiently large to cause the speed of the disk to deviate from the desired linearity for light loads by a substantial amount. It is apparent then that by reducing the transformer ratio errors the torque required to correct the meter response to light loads may be correspondingly reduced whereby the rotational speed of the disk may be caused to vary substantially in accordance with power factor of the circuit.

According to the invention the reduction of transformer ratio errors is effected by providing an auxiliary source of energization for the transformer for supplying the core losses and magnetizing current required thereby. Such operation is obtained by providing compensating winding means for the magnetic core means of the transformer to effect premagnetization thereof to a point of high permeability.

It is, therefore, an object of this invention to provide electrical measuring apparatus responsive to quantities of an electrical circuit with improved means for controlling the response thereof.

It is another object of the invention to provide induction type measuring apparatus responsive to a function of voltage, current and power factor of an electrical circuit, the apparatus being conditioned for energization from the circuit through current transformer means exhibiting ratio errors which adversely affect the response of the apparatus, said apparatus including means for reducing the transformer ratio errors to thereby improve the response of the apparatus.

It is a further object of the invention to provide a watthour meter having rotatable armature means and associated torque-producing adjustable means for correcting the light-load response of the meter, the meter being conditioned for energization from an electrical circuit through current transformer means having compensating winding means suitable for energization from a source of constant potential to effect the reduction of transformer ratio errors for permitting a corresponding reduction of the magnitude of torque required to correct the light-load response of the meter.

It is still another object of the invention to provide a combined watthour and thermal demand meter conditioned for energization from a polyphase electrical circuit through potential and current transformer means, the current transformer means exhibiting ratio errors which adversely affect the response of the watthour meter, and having compensating winding means suitable for energization from a constant potential source for reducing the ratio errors to improve the response of the watthour meter.

Other objects of the invention will be apparent from the following description, taken in conjunction with the accompanying drawings, in which.

Although the principles of the invention are applicable to single-phase and polyphase measuring equipment, the invention will be described with reference to polyphase equipment.

Figure 1:
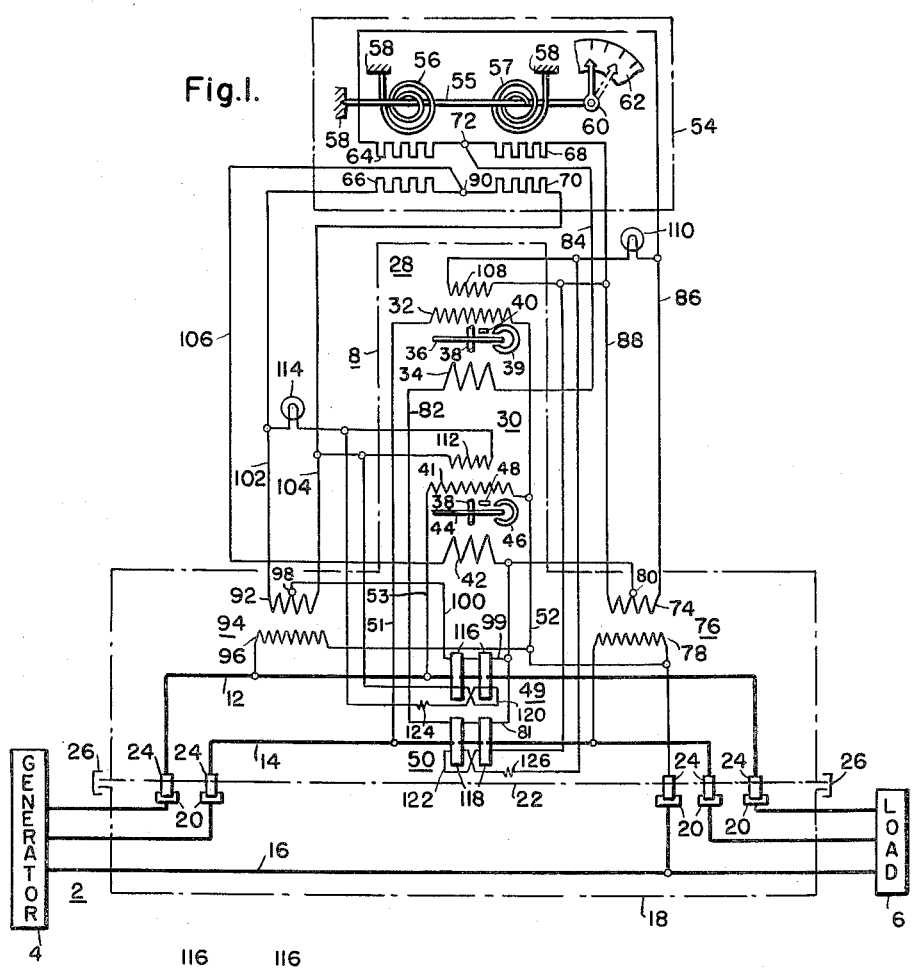
Fig. 1 is a schematic view of a measuring device embodying the invention.

Referring to Fig. 1, there is illustrated an alternating current circuit 2 for supplying electrical energy from a generator 4 to a load 6. The circuit 2 is shown as being a three-phase alternating current circuit operating normally at a frequency of 60 cycles per second. An instrument such as that shown and described in the aforesaid Petzinger patent may be associated with phase conductors 12, 14 and 16 of the polyphase circuit 2 to effect the measurement of energy and power demand of the circuit 2. Such an instrument may include an integrating watthour meter 8 of the detachable socket type mounted on a socket represented by the dot and dash line 18 provided with a plurality of upwardly extending contact members 20 which may be in the form of contact jaws. The meter 8 is supported by a base plate represented by the dot and dash line 22 which is provided with a plurality of downwardly extending contact members or blades 24 disposed for engagement with corresponding ones of the contact jaws 20. The base plate 22 and the socket 18 are secured together as by a sealing ring 26 to maintain the engagement of contact members 20 and 24 and to provide a unitary structure. As shown in the drawing, portions of the conductors 12 and 14 are detachably connected to the remainder of the conductors through the contact jaws and blades.

Figures 2, 3:
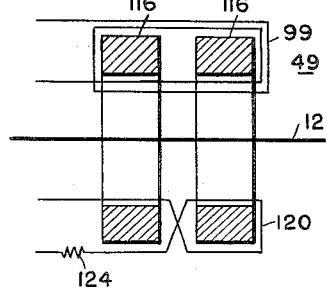
Fig. 2 is an enlarged sectional view of one of the current transformers associated with the device of Fig. 1.
Fig. 3 is a schematic diagram of one of the single-phase elements of the watthour meter of the device of Fig. 1.

The watthour meter 8 may include two substantially identical single-phase watthour meter elements 28 and 30. The element 28 includes a voltage winding 32 and a current winding 34 positioned to influence an armature member 36 mounted for rotation on a shaft 38 with respect to the associated windings. A suitable permanent damping magnet 39 is associated with the armature 36 to control the rotational speed thereof. In order to calibrate the element 28 for light loading thereof, a light-load adjuster 40 is provided as will appear hereinafter. In a similar manner, the single-phase element 30 includes a voltage winding 41, a current winding 42, an armature member 44 mounted for rotation on the common shaft 38, a damping magnet 46 and a light-load adjuster 48. The windings 32, 34, 41 and 42, when energized, cooperate with a conventional magnetic structure, portions of which are shown in Fig. 3, in a manner well understood in the art to produce shifting magnetic fields within which portions of the armature members 36 and 44 are positioned for rotation.

In order to effect the energization of current windings 34 and 42 of meter elements 28 and 30, two current transformers 49 and 50, described more fully hereinafter, are associated respectively with phase conductors 12 and 14 of the circuit 2. Current winding 34 is connected for energization from transformer 50 in accordance with current flowing through phase conductor 14. In a similar manner current winding 42 is connected for energization from transformer 49 in accordance with current flowing through phase conductor 12. By inspection of Fig. 1, it will be observed that the voltage winding 32 of meter element 28 is connected for energization through conductors 51 and 52 in accordance with voltage between the phase conductors 14 and 16. Similarly, voltage winding 41 is connected for energization through conductors 53 and 52 in accordance with voltage between phase conductors 12 and 16. If desired, suitable voltage transformer means may be employed to effect the energization of voltage windings 32 and 41. With the windings connected as illustrated and with polarities properly selected, the meter 8 measures energy supplied to load 6 in accordance with Blondel's theorem as is understood in the art.

It is desirable in many installations to provide an indication of the power demand required by the load 6. Such a demand indication is provided by means of a thermal demand meter 54 of any desired design. The demand meter 54 may include a rotatably mounted shaft 55 having associated therewith two thermo-responsive elements 56 and 57 which conveniently may be in the form of bimetallic spiral springs wound in opposite directions about the shaft 55. The shaft 55 is mounted for rotation with respect to a support structure 58 to which the outer ends of the spiral springs are attached. The inner ends of the springs are attached to the shaft 55 for the purpose of actuating the shaft in accordance with the difference between temperatures of the springs. Rotation of the shaft actuates a pointer 60 across a suitable scale 62.

In order to supply heat to the bimetallic spring 56, two heaters 64 and 66 are provided. Similarly, heat is supplied to the spring 57 from two heaters 68 and 70. The heaters 64 and 68 each have an end connected to a common terminal 72 and are connected in series across a secondary winding 74 of a voltage transformer 76. The primary winding 78 of the transformer 76 is connected for energization in accordance with the voltage between the phase conductors 14 and 16 of the circuit 2 as illustrated. A center tap 80 is provided on the secondary winding 74 of the transformer 76. The heaters 64 and 68 together with the current winding 34 of the meter 8 are energized from current transformer 50 through a circuit which may be traced from the left-hand terminal of the secondary winding 81 of transformer 50 through a conductor 82, current winding 34, a conductor 84, the terminal 72, the heaters 64 and 68 in parallel, conductors 86 and 88, and the center tap 80 back to the right-hand terminal of the secondary winding 81 of the transformer 50. In a similar manner, the heaters 66 and 70 each have an end connected to a common terminal 90 and are connected in series across secondary winding 92 of a voltage transformer 94. Transformer 94 has a primary winding 96 connected for energization in accordance with voltage between phase conductors 12 and 16 as shown. The secondary winding 92 of transformer 94 is provided with a center tap 98. The heaters 66 and 70 together with the current winding 42 are energized from the current transformer 49 through a circuit which may be traced from the left-hand terminal of the secondary winding 99 of transformer 49 through a conductor 100, center tap 98, conductors 102 and 104 in parallel, the heaters 66 and 70, the terminal 90, a conductor 106 and the current winding 42 back to the right-hand terminal of the secondary winding 99 of the transformer 49. The polarity may be such that the heaters 66 and 70 are heated respectively in accordance with the sum and difference of the voltage applied to the transformer 94 and the current flowing through phase conductor 12. Also heaters 64 and 68 may be heated respectively in accordance with the sum and difference of voltage applied to the transformer 76 and current flowing in the phase conductor 14. The demand meter 54 may be calibrated to indicate the power demand of load 6 in a manner understood in the art.

It is conventional practice to provide devices for indicating the condition of the voltage windings 32 and 41 and the voltage transformers 76 and 94. To this end an auxiliary winding 108 is inductively coupled to voltage winding 32 for the purpose of supplying energy to a voltage responsive device such as a voltmeter or lamp 110. Similarly, an auxiliary winding 112 is inductively coupled to voltage winding 41 for the purpose of supplying energy to a voltage responsive device such as the lamp 114. For a further description of the operation of such condition indicating devices, reference may be had to the aforesaid Petzinger patent.

Each of the current transformers 49 and 50 comprises a pair of closed magentic cores 116 and 118, respectively. The cores are preferably constructed of a magnetic material of high permeability such as a nickel-iron alloy and are provided with a plurality of windings. In order to maintain the physical dimensions of the combination watthour and thermal demand meter within practical limits and to provide a rigid and compact mechanical structure, it is desirable that the current transformers 49 and 50 be of the through type having primary windings comprising portions of the phase conductors 12 and 14 which thread the magnetic cores 116 and 118, respectively. Secondary windings 99 and 81 are provided for the transformers 49 and 50, respectively.

As mentioned hereinbefore, transformers exhibit ratio errors when operating under normal conditions. Such ratio errors are characterized by the fact that they become increasingly large as loading of the associated electrical circuit is decreased, the reason being that the total primary ampere-turns of the transformer varies in accordance with loading of the circuit. Consequently, the accuracy of the light-load response of induction-type instruments, such as integrating watthour meters of the type hereinbefore described, may be affected to a substantial degree.

In order to correct the affected light-load response of the separate meter elements for a predetermined power factor of the load associated therewith, such as unity power factor, the single-phase elements 28 and 30 of the meter 8 are provided with light-load adjusting means 40 and 48, respectively. The construction and operation of each of the means 40 and 48 is substantially identical. Consequently, a description of the means 40 alone will be presented.

Referring to Fig. 3, the adjusting means 40 may conveniently be in the form of a short-circuited turn of a suitable electroconductive, non-magnetic material such as brass preferably positioned adjacent the associated voltage pole 117 for adjustment relative to the pole 117 as indicated by the arrows 119 to intercept a variable portion of voltage flux. By means of a shaded-pole effect, a torque is produced for application to the disk 36. The torque so produced has a magnitude dependent upon voltage appearing between phase conductors 14 and 16 and upon the position of the means 40 relative to the voltage pole 117. To effect the light-load calibration of the single-phase element 28 for unity power factor of the load between conductors 14 and 16, the adjustable means 40 is moved relatively to the voltage pole 117 to the position effective to substantially correct the rotational speed of the disk 36 for a predetermined light-load such as ten percent of rated load of the meter. Since voltage appearing between conductors 14 and 16 is maintained substantially constant for all conditions of operation of the circuit 2, the magnitude of corrective torque applied to disk 36 will remain substantially constant for all conditions of power factor and loading of the single-phase element 28 once the means 40 is moved to the position effective to correct the response of the element 28 at ten percent rated load of the meter.

In order for the element 28 to produce a response representative of energy flowing through conductors 14 and 16 of circuit 2, it is desirable that the disk 36 have a rotational speed dependent upon power factor of the load associated with conductors 14 and 16. It is to be noted, however, that by reason of the variable nature of ratio errors, the ratio error appearing at 10% rated load is relatively large as compared to the ratio error at full load. Consequently, the amount of calibrating torque required at 10% rated load is correspondingly large and is effective to cause the rotational speed of disk 36 to deviate to a certain extent from the desired linearity. Therefore, by effecting a reduction of the magnitude of ratio error appearing at 10% rated load, a corresponding reduction of the magnitude of calibrating torque required is permitted to thereby cause the rotational speed of disk 36 to approach the desired linearity. Furthermore, the amount of torque required to effect the correction of the light-load response of the single-phase element 28 may be rendered quite small if the ratio errors are caused to be reduced by a percentage which decreases as loading of the element 28 increases. This may be explained as follows:

Induction disk-type instruments are ordinarily provided with full-load adjusting means in the form of an adjustable permanent magnet assembly such as the magnet 39 for producing a torque on the associated disk which varies in accordance with the disk speed. For correcting the full-load response of the instrument, the magnetic assembly is adjusted to provide the necessary amount of torque. Inasmuch as the corrective torque produced by the full-load adjuster varies as previously explained, the same percentage of error compensated for a full-load will also be removed at other load conditions. Since transformer ratio errors increase as loading decreases, it follows that the provision of compensating means for reducing ratio errors to a greater extent at light loads than at heavy loads operates to effectively reduce the differential existing under uncompensated conditions between the magnitudes of ratio errors appearing at light loads and those appearing at heavy loads. Consequently, if the ratio errors be reduced to a larger extent at light loads than at heavy loads, the ratio errors remaining at light loads after the proper adjustment of the full-load adjusting means has been effected are rendered quite small to thereby permit the application of a correspondingly small amount of light-load adjusting torque.

To this end compensating means are provided for each of the transformers 49 and 50. As shown in Fig. 1, the compensating means conveniently may be in the form of additional winding means 120 and 122 for the pairs of cores 116 and 118, respectively. Each of the winding means 120 and 122 is preferably connected for energization from a substantially constant potential source. The polarities of the winding means 120 and 122 are selected so that such windings have substantially zero resultant magnetic coupling relative to the associated primary and secondary windings to cause alternating voltages induced in the primary and secondary windings by windings 120 and 122 to cancel one another. As shown, the windings 120 and 122 are connected for energization through current limiting resistors 124 and 126 from auxiliary windings 112 and 108 respectively. If desired, the windings 120 and 122 may be connected directly to the secondary windings 92 and 74 of potential transformers 94 and 76 through resistors 124 and 126 to effect energization thereof. Energization of windings 120 and 122 operates to effect the magnetization of cores 116 and 118 to the extent that the respective magnetic core members are operating in a region of high permeability, thereby reducing the component of primary ampere-turns of the transformers 49 and 50 required to supply magnetizing current for the cores 116 and 118.

It has been found desirable to have the additional winding means 120 and 122 proportioned to produce magnetomotive forces substantially equivalent to exciting magnetomotive forces required to supply core loss and core magnetizing flux components for the cores 116 and 118, respectively, in the range of ten to thirty percent rated current of the watthour meter 8. The arrangement of the winding means 120 relative to the cores 116 and primary and secondary windings 12 and 99 of transformer 49 is clearly shown in Fig. 2.

By premagnetizing the cores 116 and 118 of the current transformers 49 and 50 in the manner described, the ratio errors are substantially reduced, thereby permitting corresponding reductions in the magnitudes of calibrating torques required to correct the light-load response of the separate meter elements 28 and 30. Hence, the rotational speeds of the armature members 36 and 44 may be caused to vary substantially in accordance with power factor of the load associated with the single-phase elements 28 and 30. Furthermore, by premagnetizing the pairs of cores 116 and 118 from a constant potential source, the variable ratio errors are reduced by a percentage which decreases as primary current of the separate current transformers is caused to increase. The effect of this is to narrow the differential existing under uncompensated conditions between the magnitudes of ratio errors appearing at light loads and those appearing at heavy loads. By adjusting the permanent magnets 39 and 46 to calibrate the single-phase elements of the meter 8 at full load, the amount of ratio error removed at full load is also removed at all other loads as previously explained. Consequently, the ratio error remaining at ten percent rated load is considerably less than if the winding means 120 and 122 effected a reduction of ratio errors by a constant percentage for all loads.

In addition to ratio errors, current transformers also exhibit phase-angle errors which cause slight deviations from the ideal condition of a 180° phase displacement between primary and secondary currents. It may be shown that phase-angle errors are caused in much the same manner as ratio errors, that is, by the existence of transformer exciting currents for supplying magnetizing and core loss currents. Consequently, by effecting premagnetization of the cores 116 and 118 in accordance with the invention, the phase-angle errors, as well as the ratio errors, may be reduced by a substantial amount.

Although the invention has been described with reference to certain specific embodiments thereof, numerous modifications falling within the spirit and scope of the invention are possible.

I claim as my invention:

1. In an electrical meter for measuring the energy and power demand of an electrical circuit, an electroresponsive thermal demand meter, an integrating watthour meter, means for supplying electrical energy to said thermal meter and said watthour meter including a voltage transformer having secondary winding means, and a current transformer having magnetic core means with primary and secondary winding means linking said core means, said current transformer exhibiting ratio errors which adversely affect the response of the watthour meter, and additional winding means for said current transformer linking said core means, said additional winding means being connected for energization from the secondary winding means of said voltage transformer to reduce the magnitudes of said ratio errors.

2. In a watthour meter, current terminal means to be energized in accordance with alternating current of a circuit having a substantially constant voltage, a current transformer including a pair of magnetic cores, first primary winding means linking the cores to be energized in accordance with current of the circuit, and first secondary winding means linking the cores connected to the current terminal means, said current transformer exhibiting ratio errors which vary inversely in accordance with the magnitude of energization of the current transformer, voltage terminal means to be energized in accordance with alternating voltage of the circuit, voltage transformer means including second primary winding means to be energized in accordance with voltage of the circuit, and second secondary winding means connected to said voltage terminal means, armature means mounted for rotation in response to a product function of the magnitude of current supplied to the current terminal means, the magnitude of voltage supplied to the voltage terminal means and the phase displacement between such current and voltage, said armature means producing a response having other errors dependent upon said ratio errors, adjusting means for reducing the errors in the response of the armature means, said adjusting means including first means responsive to voltage supplied to the voltage terminal means for applying a first torque to the armature means to compensate for errors in the response of the armature means at light load conditions of the circuit, said first torque having a magnitude which is substantially constant over a substantial range of current supplied to the current terminal means, said armature means producing a response which deviates from a desired linear relationship relative to the phase displacement between such current and voltage by an amount substantially dependent upon the magnitude of said first torque, and second means for applying a second torque to the armature means having a magnitude dependent upon the response of the armature means, and compensating winding means linking said cores wound with respect to said first primary and first secondary winding means to have substantially zero resultant magnetic coupling relative to said first primary and first secondary winding means, said compensating winding means being connected to said second secondary winding means for energization in accordance with said alternating voltage to thereby supply a magnetomotive force to said cores, said magnetomotive force having a substantially constant magnitude to thereby reduce said ratio errors by an amount which varies inversely in accordance with the magnitude of energization of said first primary winding means, said compensating winding means being proportioned to supply a magnetomotive force substantially equivalent to the magnetomotive force required to supply loss and magnetizing components of magnetic flux for said cores within the range of ten to thirty percent rated current load of the meter.

3. In an electrical meter for measuring the energy and power demand of an electrical circuit, an electroresponsive thermal demand meter, an integrating watthour meter, means for supplying electrical energy to said thermal meter and said watthour meter, said means including a voltage transformer having secondary winding means, and a current transformer having a pair of closed magnetic core members, primary and secondary winding means linking said core members, said current transformer exhibiting ratio errors which adversely affect the response of the watthour meter, and additional winding means for said current transformer linking said core members, said additional winding means being wound with respect to the primary and secondary winding means of the current transformer to have substantially zero resultant magnetic coupling relative to the primary and secondary winding means of the current transformer, said additional winding means being connected for energization from the secondary winding means of the voltage transformer to reduce the magnitudes of said ratio errors.

4. In an electrical meter for measuring the energy and power demand of an electrical circuit, an electroresponsive thermal demand meter, an integrating watthour meter, means for supplying electrical energy to said thermal meter and said watthour meter, said means including a voltage transformer having secondary winding means, and a current transformer having a pair of closed magnetic core members, primary and secondary winding means linking said core members, said current transformer exhibiting ratio errors which adversely affect the response of the watthour meter, and additional winding means for said current transformer linking said core members, said additional winding means being wound with respect to the primary and secondary winding means of the current transformer to have substantially zero resultant magnetic coupling relative to the primary and secondary winding means of the current transformer, said additional winding means being connected for energization from the secondary winding means of the voltage transformer to reduce the magnitudes of said ratio errors, said additional winding means being proportioned to supply a magnetomotive force substantially equivalent to the magnetomotive force required to supply loss and magnetizing component fluxes for said core members within the range of ten to thirty percent rated current of the meter.

5. In a watthour meter, current terminal means to be energized in accordance with alternating current of a circuit having a substantially constant voltage, a current transformer including a pair of closed magnetic cores, primary winding means linking the cores to be energized in accordance with current of the circuit, secondary winding means linking the cores connected to the current terminal means, said transformer exhibiting ratio errors which vary inversely in accordance with energization of the transformer, voltage terminal means to be energized in accordance with alternating voltage of the circuit, armature means mounted for rotation in response to a product function of the magnitude of current supplied to the current terminal means, the magnitude of voltage supplied to the voltage terminal means and the phase displacement between such current and voltage, said armature means producing a response having other errors dependent upon said ratio errors, adjusting means for reducing the errors in the response of the armature means, said adjusting means including first means responsive to voltage supplied to the voltage terminal means for applying a first torque to the armature means to compensate for errors in the response of the armature means at light load conditions of the circuit, said first torque having a magnitude which is substantially constant over a substantial range of current supplied to the current terminal means, said armature means producing a response which deviates from a desired linear relationship relative to the phase displacement between such current and voltage by an amount substantially dependent upon the magnitude of said first torque, and second means for applying a second torque to the armature means having a magnitude dependent upon the response of the armature means, said meter including means for supplying a substantially constant alternating voltage, and compensating winding means linking said cores having spaced terminal means connected to said voltage supply means for energization from said voltage supply means, said compensating winding means being wound with respect to said primary and secondary winding means to have substantially zero resultant magnetic coupling relative to said primary and secondary winding means, said compensating winding means being effective when energized to supply a substantially constant magnetomotive force to said transformer for reducing said ratio errors by an amount which varies inversely in accordance with the magnitude of energization of the transformer whereby said second torque influences said armature means for light load conditions of the circuit to permit a substantial reduction in the magnitude of first torque required to compensate for errors in the response of the armature means.

6. In a watthour meter, current terminal means to be energized in accordance with alternating current of a circuit having a substantially constant voltage, a current transformer including a pair of closed magnetic cores, primary winding means linking the cores to be energized in accordance with current of the circuit, secondary winding means linking the cores connected to the current terminal means, said transformer exhibiting ratio errors which vary inversely in accordance with energization of the transformer, voltage terminal means to be energized in accordance with alternating voltage of the circuit, armature means mounted for rotation in response to a product function of the magnitude of current supplied to the current terminal means, the magnitude of voltage supplied to the voltage terminal means and the phase displacement between such current and voltage, said armature means producing a response having other errors dependent upon said ratio errors, adjusting means for reducing the errors in the response of the armature means, said adjusting means including first means responsive to voltage supplied to the voltage terminal means for applying a first torque to the armature means to compensate for errors in the response of the armature means at light load conditions of the circuit, said first torque having a magnitude which is substantially constant over a substantial range of current supplied to the current terminal means, said armature means producing a response which deviates from a desired linear relationship relative to the phase displacement between such current and voltage by an amount substantially dependent upon the magnitude of said first torque, and second means for applying a second torque to the armature means having a magnitude dependent upon the response of the armature means, said meter including means for supplying a substantially constant alternating voltage, and compensating winding means linking said cores having spaced terminal means connected to said voltage supply means for energization from said voltage supply means, said compensating winding means being wound with respect to said primary and secondary winding means to have substantially zero resultant magnetic coupling relative to said primary and secondary winding means, said compensating winding means being effective when energized to supply a substantially constant magnetomotive force to said transformer for reducing said ratio errors by an amount which varies inversely in accordance with the magnitude of energization of the transformer whereby said second torque influences said armature means for light load conditions of the circuit to permit a substantial reduction in the magnitude of first torque required to compensate for errors in the response of the armature means, said compensating winding means being proportioned to supply a magnetomotive force substantially equivalent to the magnetomotive force required to supply loss and magnetizing components of magnetic flux for said cores within the range of ten to thirty percent rated current load of the instrument.

References Cited in the file of this patent
UNITED STATES PATENTS

| | | |
|---|---|---|
| 1,706,139 | Boyajian et al. | Mar. 19, 1929 |
| 2,218,668 | Wagner | Oct. 22, 1940 |
| 2,521,869 | Petzinger | Sept. 12, 1950 |
| 2,571,938 | Petzinger | Oct. 16, 1951 |

FOREIGN PATENTS

| | | |
|---|---|---|
| 306,826 | Great Britain | Feb. 22, 1929 |

OTHER REFERENCES

James: Electricity Meters and Instrument Transformers, published by Chapman and Hall, London, in 1952, pages 129 and 130. (Copy in Scientific Library.)